US010721610B2

(12) United States Patent
Qin et al.

(10) Patent No.: US 10,721,610 B2
(45) Date of Patent: Jul. 21, 2020

(54) COMMUNICATION METHOD AND APPARATUS FOR PR-ASSOCIATION RICH MEDIA EXCHANGE

(71) Applicant: Huawei Technologies Co., Ltd., Shenzhen (CN)

(72) Inventors: Wei Qin, Shenzhen (CN); Xiaoxian Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/771,855

(22) PCT Filed: May 20, 2016

(86) PCT No.: PCT/CN2016/082847
§ 371 (c)(1),
(2) Date: Apr. 27, 2018

(87) PCT Pub. No.: WO2017/197646
PCT Pub. Date: Nov. 23, 2017

(65) Prior Publication Data
US 2018/0317078 A1 Nov. 1, 2018

(51) Int. Cl.
H04W 8/00 (2009.01)
H04W 84/02 (2009.01)
(Continued)

(52) U.S. Cl.
CPC ............ *H04W 8/005* (2013.01); *H04L 67/16* (2013.01); *H04M 15/00* (2013.01); *H04M 15/80* (2013.01);
(Continued)

(58) Field of Classification Search
CPC ....... H04W 8/005; H04W 76/10; H04W 4/24; H04W 48/16; H04W 84/02; H04W 84/12; H04L 67/16; H04M 15/00; H04M 15/80
See application file for complete search history.

(56) References Cited

U.S. PATENT DOCUMENTS 9,332,488 B2 * 5/2016 Mahaffy ................. H04L 67/16
9,699,638 B2 * 7/2017 Hong .................... H04W 8/005
(Continued)

FOREIGN PATENT DOCUMENTS

CN 1797978 B 5/2010
CN 102801937 A 11/2012
(Continued)

OTHER PUBLICATIONS

Machine Translation and Abstract of Chinese Publication No. CN1797978, May 5, 2010, 12 pages.
(Continued)

Primary Examiner — Habte Mered
(74) Attorney, Agent, or Firm — Conley Rose, P.C.

(57) ABSTRACT

A method of communication between a first apparatus and a second apparatus, and pertains to the field of communications technologies. The method includes receiving, by the second apparatus before the second apparatus is associated with the first apparatus, a radio signal from the first apparatus carrying a message frame, detecting rich media information in the message frame, and providing the rich media information on a user screen of the second apparatus to help a user make an association decision.

20 Claims, 16 Drawing Sheets

(51) Int. Cl.
| | | |
|---|---|---|
| *H04M 15/00* | (2006.01) | |
| *H04W 4/24* | (2018.01) | |
| *H04W 76/10* | (2018.01) | |
| *H04W 48/16* | (2009.01) | |
| *H04W 84/12* | (2009.01) | |
| *H04L 29/08* | (2006.01) | |

(52) U.S. Cl.
CPC ............ *H04W 4/24* (2013.01); *H04W 48/16* (2013.01); *H04W 76/10* (2018.02); *H04W 84/02* (2013.01); *H04W 84/12* (2013.01)

(56) References Cited

U.S. PATENT DOCUMENTS

| | | | | |
|---|---|---|---|---|
| 2007/0264991 | A1* | 11/2007 | Jones | H04M 1/7253 455/420 |
| 2012/0054106 | A1* | 3/2012 | Stephenson | H04W 4/21 705/50 |
| 2012/0099476 | A1* | 4/2012 | Mahaffy | H04L 67/16 370/254 |
| 2012/0243524 | A1* | 9/2012 | Verma | H04W 48/16 370/338 |
| 2013/0230036 | A1* | 9/2013 | Reznik | H04L 67/16 370/338 |
| 2014/0171069 | A1* | 6/2014 | Pang | H04W 36/0083 455/432.1 |
| 2014/0241331 | A1* | 8/2014 | Ma | G06Q 30/0267 370/338 |
| 2014/0258395 | A1 | 9/2014 | Tng | |
| 2015/0110099 | A1 | 4/2015 | Chen et al. | |
| 2015/0156687 | A1 | 6/2015 | Wu et al. | |
| 2015/0163702 | A1 | 6/2015 | Wu et al. | |
| 2015/0163703 | A1 | 6/2015 | Wu et al. | |
| 2015/0208324 | A1* | 7/2015 | McCann | H04W 48/10 370/338 |
| 2015/0256840 | A1* | 9/2015 | Sato | H04N 19/186 375/240.03 |
| 2016/0029298 | A1* | 1/2016 | Bergstrom | H04W 48/18 455/434 |
| 2016/0134710 | A1* | 5/2016 | Ryu | H04L 67/16 370/338 |
| 2016/0164933 | A1* | 6/2016 | Kafle | H04L 65/1069 709/219 |
| 2016/0277469 | A1* | 9/2016 | Gilson | H04L 65/4069 |
| 2016/0337945 | A1* | 11/2016 | Watt | H04W 76/10 |
| 2017/0019840 | A1* | 1/2017 | Torab Jahromi | H04L 67/16 |
| 2017/0078408 | A1* | 3/2017 | Lepp | H04L 67/16 |
| 2017/0164414 | A1* | 6/2017 | Cho | H04L 61/2015 |

FOREIGN PATENT DOCUMENTS

| | | |
|---|---|---|
| CN | 103078695 A | 5/2013 |
| CN | 103517372 A | 1/2014 |
| CN | 103686941 A | 3/2014 |
| CN | 103828435 A | 5/2014 |
| CN | 103874047 A | 6/2014 |
| CN | 103875264 A | 6/2014 |
| CN | 103875265 A | 6/2014 |
| CN | 104038912 A | 9/2014 |
| CN | 105263110 A | 1/2016 |
| CN | 105303408 A | 2/2016 |
| CN | 105357741 | 2/2016 |
| CN | 103748905 B | 1/2018 |
| GB | 2526912 A | 12/2015 |

OTHER PUBLICATIONS

Machine Translation and Abstract of Chinese Publication No. CN102801937, Nov. 28, 2012, 7 pages.
Machine Translation and Abstract of Chinese Publication No. CN103078695, May 1, 2013, 16 pages.
Machine Translation and Abstract of Chinese Publication No. CN103517372, Jan. 15, 2014, 22 pages.
Machine Translation and Abstract of Chinese Publication No. CN103686941, Mar. 26, 2014, 19 pages.
Machine Translation and Abstract of Chinese Publication No. CN103748905, Jan. 2, 2018, 26 pages.
Machine Translation and Abstract of Chinese Publication No. CN105303408, Feb. 3, 2016, 12 pages.
"Part 11: Wireless LAN Medium Access Control (MAC) and Physical Layer (PHY) Specifications," IEEE Computer Society, IEEE Std 802.11, Mar. 29, 2012, Part 1, 1396 pages.
"Part 11: Wireless LAN Medium Access Control (MAC) and Physical Layer (PHY) Specifications," IEEE Computer Society, IEEE Std 802.11, Mar. 29, 2012, Part 2, 1397 pages.
"Part 11: Wireless LAN Medium Access Control (MAC) and Physical Layer (PHY) specifications: Higher-Speed Physical Layer Extension in the 2.4 GHz Band," IEEE Std 802.11b, Sep. 16, 1999, 96 pages.
Foreign Communication From A Counterpart Application, PCT Application No. PCT/CN2016/082847, English Translation of International Search Report dated Jan. 25, 2017, 2 pages.
Machine Translation and Abstract of Chinese Publication No. CN104038912, Sep. 10, 2014, 6 pages.
Machine Translation and Abstract of Chinese Publication No. CN105357741, Feb. 24, 2016, 7 pages.
Foreign Communication From A Counterpart Application, Chinese Application No. 201680026122.5, Chinese Office Action dated Jun. 18, 2019, 10 pages.
Machine Translation and Abstract of Chinese Publication No. CN105263110, Jan. 20, 2016, 16 pages.
"Part 11: Wireless LAN Medium Access Control (MAC) and Physical Layer (PHY) Specifications," IEEE Std 802.11, Jun. 12, 2007, 1232 pages.
Foreign Communication From A Counterpart Application, Chinese Application No. 201680026122.5, Chinese Office Action dated Feb. 3, 2020, 8 pages.

* cited by examiner

| MAC header | Time stamp | Beacon Interval | Capability | Service Set Identifier (SSID) | ... | Vendor Specific |
|---|---|---|---|---|---|---|
| | | | | | | |

FIG. 5B

| MAC header | Supported Rates | Request Information | ... | Vendor Specific | | |
|---|---|---|---|---|---|---|
| | | | | | | |

FIG. 5C

| MAC header | Time stamp | Beacon Interval | Capability | Service Set Identifier (SSID) | ... | Vendor Specific |
|---|---|---|---|---|---|---|
| | | | | | | |

FIG. 5D

| MAC header | Supported Rates | Request Information | ... | Service hash | Vendor Specific | | |
|---|---|---|---|---|---|---|---|
| | | | | | | | |

| MAC header | Time stamp | Beacon Interval | Capability | Service Set Identifier (SSID) | ... | Service name | Vendor Specific |
|---|---|---|---|---|---|---|---|
| | | | | | | | |

FIG. 6C

| MAC header | ... | Service information request length | Service information request | Vendor specific |
|---|---|---|---|---|
| | | | | |

FIG. 6D

| MAC header | | ... | Service information descriptor | Vendor specific |
|---|---|---|---|---|
| | | | | |

FIG. 6E

| MAC header | Time stamp | Beacon Interval | Capability | Service Set Identifier (SSID) | ... | P2P IE | Vendor Specific |
|---|---|---|---|---|---|---|---|
| | | | | | | | |

FIG. 7E

| Element ID | Length | ... | P2P Capability | P2P device info (including a device name) | P2P Advertised info | |
|---|---|---|---|---|---|---|
| | | | | | | |

FIG. 7F

| Attribute ID | Length | P2P Device Address | ... | Device name (variable length) | |
|---|---|---|---|---|---|
| | | | | | |

FIG. 7G

| MAC header | Category | Action field | ... | NAN Attribute | | |
|---|---|---|---|---|---|---|

| Attribute ID | Length | Service ID | ... | Service info (variable length) | | |
|---|---|---|---|---|---|---|

# COMMUNICATION METHOD AND APPARATUS FOR PR-ASSOCIATION RICH MEDIA EXCHANGE

CROSS-REFERENCE TO RELATED APPLICATION

This application is a U.S. National Stage of International Patent Application No. PCT/CN2016/082847 filed on May 20, 2016, which is hereby incorporated by reference in its entirety.

TECHNICAL FIELD

The present disclosure relates to the communications field, and in particular, to a communication method and an apparatus.

BACKGROUND

As shown in FIG. 1, in a wireless local area network (WLAN), an access point (AP) may send a WI-FI signal, and WI-FI devices such as a mobile phone, a personal computer (PC), and a wearable device may receive the WI-FI signal. Alternatively, a mobile phone, a PC, and a wearable device may respectively send a WI-FI signal or simultaneously send a WI-FI signal, and an AP may receive the WI-FI signal.

FIG. 2 shows a display screen when a WI-FI device accesses WI-FI. A displayed WI-FI network name list is merely a character string name list, and a WI-FI access screen is monotonously simple.

SUMMARY

Embodiments of the present disclosure provide a communication method and an apparatus, which can enable a user of a first device to publish rich media information to a second device compared with other approaches.

According to a first aspect, an embodiment of the present disclosure provides a device, including a transceiver circuit configured to transmit and receive a radio signal, an interface circuit configured to provide a user screen, provide information for a user, and receive input of the user, and a control circuit configured to receive a message frame in the radio signal from another device, where the message frame is received before the device is associated with the other device, detect rich media information in the message frame, and provide the rich media information using the user screen to help the user make an association decision.

In the foregoing solution, an implementation that rich media are used as an information publishing platform may be used to shorten a distance for communication between an information publisher and an information receiver. Because both the information publisher and the information receiver are in a same local area network, the information publisher and the information receiver may exchange opinions about matter of interest offline. Therefore, various transactions are easily conducted, an activity is organized, and information is shared.

In a first possible implementation of the first aspect, the control circuit is configured to receive a first message frame including an indicator, where the indicator indicates that the other device supports pre-association rich media, and generate a request message that is to be sent to the other device in order to request the rich media information from the other device.

In the foregoing solution, the device receives indication information indicating that the other device supports the rich media, and requests the rich media information from the other device according to the indication information. The rich media information is requested according to the indication information such that the rich media information may be obtained.

With reference to the first possible implementation of the first aspect, in a second possible implementation, the control circuit is configured to receive the first message frame, detect an indicator in a vendor specific field of the first message frame, receive a second message frame including rich media content after generating the request message, and detect the rich media content in a vendor specific field of the second message frame.

In the foregoing solution, the indicator indicating that the rich media are supported and the rich media information are included in the vendor specific field. When an expanded vendor specific field is used, more indicators indicating that the rich media are supported and more rich media information can be transmitted.

In a third possible implementation of the first aspect, the control circuit is configured to receive the message frame, and the message frame is carried in at least one of the following signals that are from the other device, a beacon signal, a probe response signal, or a service discovery response signal.

The foregoing solution describes which signal can be used to carry the rich media information such that a message frame has more signals for selection.

In a fourth possible implementation of the first aspect, the control circuit is configured to generate a probe request message frame, the probe request message frame includes a request indicator, and the request indicator instructs to probe a device that supports rich media.

In the foregoing solution, the device explores externally and queries whether the rich media is supported. In this way, the device more actively obtains the rich media information from the outside.

In a fifth possible implementation of the first aspect, the control circuit is configured to provide a screen indicator on the user screen, to show the rich media information.

In the foregoing solution, the rich media information is displayed such that a user of the device chooses whether to be associated with the other device.

With reference to the fifth possible implementation of the first aspect, in a sixth possible implementation, the control circuit is configured to receive an association instruction from the user using the interface circuit, generate an association request frame, and send to the other device a radio signal that carries the association request frame.

In the foregoing solution, based on the association instruction sent by the user of the device, an association request is sent to a device that sends the rich media information such that the device that sends the rich media information can be associated with the device.

According to a second aspect, an embodiment of the present disclosure provides a method of communication between a first apparatus and a second apparatus, including receiving, by the second apparatus before the second apparatus is associated with the first apparatus, a radio signal that is sent by the first apparatus and that carries a message frame, detecting rich media information in the message frame, and providing the rich media information on a user screen of the second apparatus to help a user make an association decision.

In the foregoing solution, an implementation that rich media are used as an information publishing platform may be used to shorten a distance for communication between an information publisher and an information receiver. Because both the information publisher and the information receiver are in a same local area network, the information publisher and the information receiver may exchange opinions about matter of interest offline. Therefore, various transactions are easily conducted, an activity is organized, and information is shared.

In a first possible implementation of the second aspect, the method includes receiving a first message frame, where the first message frame includes an indicator, and the indicator indicates that the first apparatus supports pre-association rich media, and generating a request message to request the rich media information from the first apparatus.

In the foregoing solution, the device receives indication information indicating that another device supports the rich media, and requests the rich media information from the other device according to the indication information. The rich media information is requested according to the indication information such that the rich media information may be obtained.

With reference to the first possible implementation of the second aspect, in a second possible implementation, the method further includes detecting the indicator in a vendor specific field of the first message frame, receiving a second message frame including rich media content in response to the request message, and detecting the rich media content in a vendor specific field of the second message frame.

In the foregoing solution, the indicator indicating that the rich media are supported and the rich media information are included in the vendor specific field. When an expanded vendor specific field is used, more indicators indicating that the rich media are supported and more rich media information can be transmitted.

In a third possible implementation of the second aspect, the second apparatus receives the radio signal that is sent by the first apparatus and that carries the message frame, and before the second apparatus is associated with the first apparatus, the method further includes at least one of receiving the message frame, where the message frame is carried in a beacon signal, and the beacon signal is sent by the first apparatus, receiving the message frame, where the message frame is carried in a probe response signal, and the probe response signal is sent by the first apparatus, or receiving the message frame, where the message frame is carried in a service discovery response signal, and the service discovery response signal is sent by the first apparatus.

The foregoing solution describes which signal can be used to carry the rich media information such that a message frame has more signals for selection.

In a fourth possible implementation of the second aspect, the method further includes generating a probe request message frame, where the probe request message frame includes a request indicator, and the request indicator instructs to probe a device that supports rich media, and receiving the message frame that is sent by the first apparatus after the first apparatus receives the probe request message frame.

In the foregoing solution, the device explores externally and queries whether the rich media is supported. In this way, the device more actively obtains the rich media information from the outside.

In a fifth possible implementation of the second aspect, providing the rich media information on a user screen of the second apparatus to help a user make an association decision includes providing a screen indicator on the user screen to indicate the rich media information.

In the foregoing solution, the rich media information is displayed such that a user of the device chooses whether to be associated with the other device.

With reference to the fifth possible implementation of the second aspect, in a sixth possible implementation, the method further includes receiving an association instruction from the user using the user screen, generating an association request frame, and sending to the first apparatus a radio signal that carries the association request frame.

In the foregoing solution, based on the association instruction sent by the user of the device, an association request is sent to a device that sends the rich media information such that the device that sends the rich media information can be associated with the device.

According to a third aspect, an embodiment of the present disclosure provides a device, including a control circuit configured to generate a message frame, where rich media information is included in the message frame, and a transceiver circuit configured to transmit and receive a radio signal, where the transceiver circuit is configured to send the radio signal to carry the message frame such that another device receives the message frame before the device is associated with the other device, and the other device uses the rich media information to help a user of the other device make an association decision.

In the foregoing solution, an implementation that rich media are used as an information publishing platform may be used to shorten a distance for communication between an information publisher and an information receiver. Because both the information publisher and the information receiver are in a same local area network, the information publisher and the information receiver may exchange opinions about matter of interest offline. Therefore, various transactions are easily conducted, an activity is organized, and information is shared.

In a first possible implementation of the second aspect, the control circuit is configured to receive an instruction, enable a rich media feature, and generate the message frame in response to the instruction.

In the foregoing solution, the rich media feature is initially enabled, the message frame is generated, and the message frame includes the rich media information. The foregoing solution discloses a process of generating the message frame to facilitate subsequent processing.

In a second possible implementation of the second aspect, the control circuit is configured to generate a first message frame, the first message frame includes an indicator, and the indicator indicates that pre-association rich media are supported.

In the foregoing solution, the device indicates, using the first message frame, that the device supports the rich media feature to notify a device that receives the first message frame such that the device that receives the first message frame requests the rich media.

With reference to the second possible implementation of the second aspect, in a third possible implementation, the control circuit is configured to generate the first message frame, and the indicator is included in a vendor specific field of the first message frame.

In the foregoing solution, the indicator is included in the vendor specific field of the first message frame such that the vendor specific field is fully used.

With reference to the third possible implementation of the second aspect, in a fourth possible implementation, the control circuit is configured to generate a second message frame in response to a request message frame of the other device, and rich media content is included in a vendor specific field of the second message.

In the foregoing solution, the rich media content is included in the vendor specific field of the second message and is sent to a device that receives the rich media content such that the vendor specific field of the second message is fully used.

In a fifth possible implementation of the second aspect, the control circuit is configured to generate at least one of a beacon frame, a probe response frame, or a service discovery response frame, to include the rich media information.

In the foregoing solution, the rich media content may be included in at least one of the beacon frame, the probe response frame, or the service discovery response frame such that more frames can be selected to include the rich media content.

BRIEF DESCRIPTION OF DRAWINGS

To describe the technical solutions in the embodiments of the present disclosure more clearly, the following briefly describes the accompanying drawings required for describing the embodiments.

FIG. 5B is a schematic structural diagram of a beacon frame according to a third embodiment of the present disclosure;

FIG. 5C is a schematic structural diagram of a frame for requesting rich media information according to a third embodiment of the present disclosure;

FIG. 5D is a schematic structural diagram of a probe response frame according to a third embodiment of the present disclosure;

FIG. 6C is a schematic structural diagram of a probe response frame according to a fourth embodiment of the present disclosure;

FIG. 6D is a schematic structural diagram of a service discovery request frame according to a fourth embodiment of the present disclosure;

FIG. 6E is a schematic structural diagram of a service discovery response frame according to a fourth embodiment of the present disclosure;

FIG. 7E is a schematic diagram of a frame structure of a P2P probe response frame according to a fifth embodiment of the present disclosure;

FIG. 7F is a schematic diagram of a P2P IE field of a P2P probe response frame according to a fifth embodiment of the present disclosure;

FIG. 7G is a schematic diagram of a P2P device info attribute in a P2P IE field of a P2P probe response frame according to a fifth embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
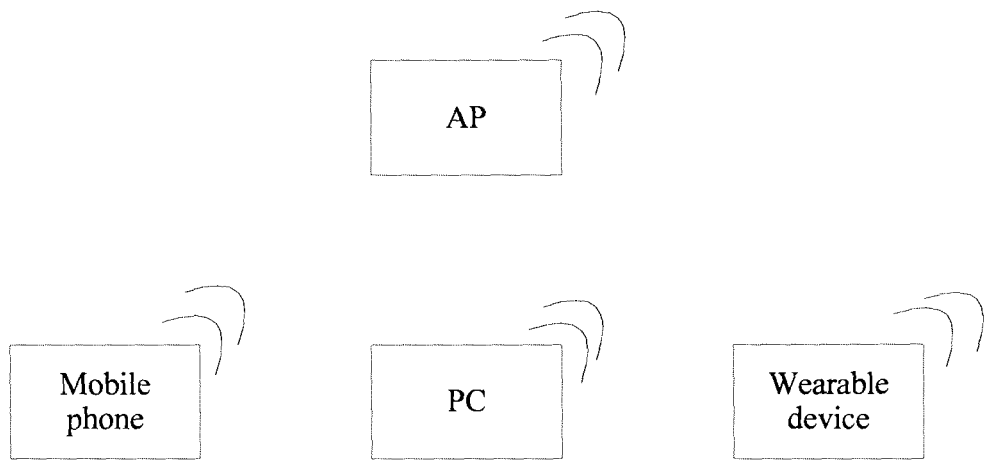
FIG. 1 is a schematic diagram of a WLAN.

As shown in FIG. 1, in a WLAN, an AP may send a WI-FI signal, and WI-FI devices such as a mobile phone, a PC, and a wearable device may receive the WI-FI signal. Alternatively, conversely, a mobile phone, a PC, and a wearable device may send a WI-FI signal, and an AP may receive the WI-FI signal.

Figure 2:
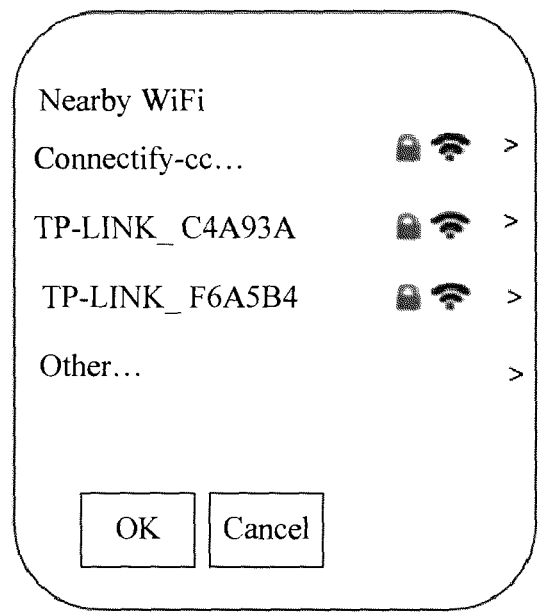
FIG. 2 shows a display screen when a mobile terminal apparatus accesses WI-FI.

FIG. 2 shows a display screen when a WI-FI device accesses WI-FI. A displayed WI-FI network name list is merely a character string name list, and a WI-FI access screen is monotonously simple.

First Embodiment

Figure 3A:
FIG. 3A is a schematic diagram of a name list of to-be-accessed WI-FI networks when a WI-FI device accesses WI-FI according to a first embodiment of the present disclosure.

FIG. 3A shows a name list of to-be-accessed WI-FI networks when a WI-FI device accesses WI-FI. It may be learned from FIG. 3A that each WI-FI network name is a sentence instead of a character string. Further, at least one WI-FI network name may not be a character string. Some WI-FI network names, such as "Sell . . . after resignation" may be used as published information, and may also be WI-FI network names. Some WI-FI network names, such as "Give me a girlfriend on Valentine's Day" may be ways of short-distance socializing in addition to WI-FI network names. Some WI-FI network names, such as "Share a car with me to go to the beach?" may be information publishing in addition to WI-FI network names.

As shown in FIG. 3A, a profile picture of an information publisher corresponding to each WI-FI network name is on the left of the WI-FI network name such that WI-FI network access becomes funny. Three icons on the right of each WI-FI network name are sequentially a password locking icon, a WI-FI network signal icon, and a further information icon (which is represented by a right-facing angle bracket) from left to right.

The password locking icon indicates that access to this WI-FI requires password authentication.

The WI-FI network signal icon represents strength of a WI-FI network signal. When two curves are blacked, it indicates a strongest WI-FI signal. When one curve is blacked, it indicates medium WI-FI signal strength. When no curve is blacked, it indicates a weak WI-FI signal or no WI-FI signal.

The further information icon is represented by a right-facing angle bracket. After a user taps a further information icon corresponding to any WI-FI network name, or taps any WI-FI network name, a display screen may be changed to a display screen shown in FIG. 3B. For some WI-FI network names, such as "Sell . . . after resignation," icons on the right of the WI-FI network name are changed to a chat icon and two different play icons.

The chat icon is represented by a floating balloon. When the chat icon is tapped, a current display screen is changed to a chat screen, and chatting participants are a user of the WI-FI device and a seller who sells home appliances. After entering the chat screen, the user of the WI-FI device may further communicate with the seller who sells home appliances about the home appliances.

A first play icon described above is a video play icon, and is on the right of the chat icon and adjacent to the chat icon. The video play icon is displayed as a play button. After the video play icon is tapped, a current display screen is changed to a video play screen. Played content is a video that is played by the seller for the user of the WI-FI device. The played video content may be a current status of to-be-sold home appliances in this play example.

The other play icon is an audio play icon, and is on the right of the video play icon. The audio play icon is displayed as a speaker that is playing sound. After the audio play icon is tapped, the WI-FI device may play audio preset by the seller. The audio may be detailed information of the to-be-sold home appliances in this example, and may further include an introduction to the seller and the like.

Figure 3B:
FIG. 3B is another schematic diagram of a name list of to-be-accessed WI-FI networks when a WI-FI device accesses WI-FI according to a first embodiment of the present disclosure.

Further, coordinate information is not shown for the WI-FI network name "Sell . . . after resignation" in FIG. 3B. After the user taps a coordinate information icon, a current interface is switched to an interface that displays location coordinates of a host device that publishes the information.

In FIG. 3B, icons on the right of a WI-FI network name such as "Give me a girlfriend on Valentine's day" in the second row may be a chat icon and a personal web page icon. After the user taps the chat icon, a current display screen is changed to a chat screen, and chatting participants are a user of the WI-FI device and an information publisher. After entering the chat screen, the user of the WI-FI device may chat with the information publisher, and the user of the WI-FI device and the information publisher may send information such as a file, a picture, a video, or audio to each other.

After the user taps the personal web page icon, a current interface is switched to a personal web page of the information publisher. The publisher may show various personal information of the information publisher using the personal web page to make a friend.

Further, coordinate information is not shown for the WI-FI network name "Give me a girlfriend on Valentine's Day" in FIG. 3B. After the user taps a coordinate information icon, a current interface is switched to an interface that displays location coordinates of a host device that publishes the information.

In FIG. 3B, icons on the right of a WI-FI network name such as "Share a car with me to go to the beach?" in the third row may be a video play icon and an audio play icon. After the user taps the video play icon, a current interface is switched to a video play interface, and a video is played on the video play interface. The video may be information that is provided by the information publisher, such as a status of the beach, a status of a vehicle used for going to the beach, and people who are going to the beach.

The audio play icon is displayed as a speaker that is playing sound. After the audio play icon is tapped, the WI-FI device may play audio preset by the seller. The audio may be audio about the information provided by the information publisher in this example, such as the status of the beach, the status of the vehicle used for going to the beach, and the people who are going to the beach.

Further, coordinate information is not shown for the WI-FI network name "Share a car with me to go to the beach?" in FIG. 3B. After the user taps a coordinate information icon, a current interface is switched to an interface that displays location coordinates of a host device that publishes the information.

In the foregoing three examples in FIG. 3B, a WI-FI network name of the host device is changed, using rich media, to a way of publishing information. When an icon for further information exchange is tapped, the WI-FI device may further interact with the host device. An implementation that the rich media are used as an information publishing platform may be used to shorten a distance that needs to be overcome for face-to-face communication between an information publisher and an information receiver. Because both the information publisher and the information receiver are in a same local area network, the information publisher and the information receiver may exchange opinions about matter of interest offline. Therefore, various transactions are easily conducted, an activity is organized, and information is shared.

Second Embodiment

Figure 4:
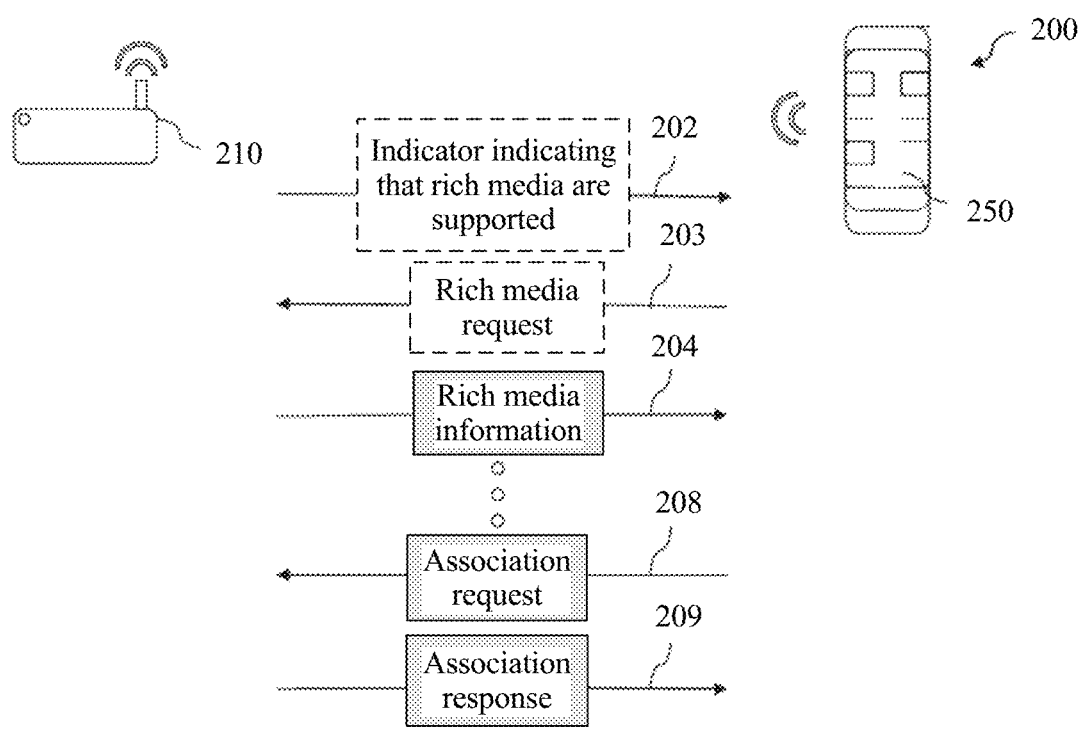
FIG. 4 is a flowchart of a method procedure example according to a second embodiment of the present disclosure.

FIG. 4 is a flowchart of a method procedure example according to a second embodiment of the present disclosure. A wireless communications system 200 is an example of an AP-station (STA) type in a wireless communications system. The communications system 200 includes an AP apparatus 210 and a mobile terminal apparatus 250. Before the AP apparatus 210 is associated with the terminal apparatus 250, the AP apparatus 210 expects that an apparatus receives rich media information of the AP apparatus 210. Therefore, the AP apparatus 210 sends to the terminal apparatus 250 a radio signal 204 that carries the rich media information.

In an operation, the AP apparatus 210 broadcasts the radio signal 204 that carries the rich media information. In an example, the radio signal 204 is a beacon signal. The AP apparatus 210 periodically sends the beacon signal that carries a beacon frame. The beacon frame includes a service set ID (SSID), and the SSID indicates that there is a local area network. The beacon frame is one of management frames. In addition, in an example, the rich media information can be carried in a vendor specific field of the beacon frame of the beacon signal 204.

In an example, when the mobile terminal apparatus 250 receives the beacon signal 204, the rich media information can be extracted and presented on a user screen. For example, when the rich media information includes texts such as a service introduction, a discount coupon summary, a short slogan, and similar content, these texts may be displayed on a touchscreen display. Further, in an example, the rich media information includes an indicator that indicates rich media of another type, such as an indicator indicating audio, an indicator indicating a video, or similar content. An icon related to a type of the rich media can be displayed on the touchscreen display.

According to another aspect of the present disclosure, the radio signal 204 that carries the rich media information is sent in response to a request. In an example, the AP apparatus 210 broadcasts a beacon signal 202, the beacon signal 202 carries an indicator indicating that rich media are supported, and the indicator indicates that the AP apparatus 210 supports the rich media. When the mobile terminal apparatus 250 receives a beacon signal, the mobile terminal apparatus 250 sends to the AP device 210 a radio signal 203 that carries a rich media request. When receiving the rich media request, in response to the rich media request, the AP apparatus 210 sends the radio signal 204 that carries the rich media information.

In an example, the rich media information is added to a vendor specific field of the management frame and is sent. When the mobile terminal apparatus 250 receives the rich media information, the rich media information can be presented on a user interface. The user interface is described in detail, and receiving of an association instruction using the interface is to be described with reference to FIG. 5A to FIG. 5D.

If further interaction is required, a connection (i.e. association) may be established in step 208 and step 209, and after the connection is established, exchanged content is transmitted using a data frame. Alternatively, a connection may not be established, exchange is still performed using a probe request and a probe response, and exchanged content is carried in a vendor specific field.

This embodiment of the present disclosure further provides a manner in which the AP apparatus 210 (referred to as an AP below in this example) starts to indicate, in the probe response, that the rich media are supported. Further, a beacon frame that is sent by the AP to the mobile terminal apparatus 250 (referred to as a STA below in this example) is an existing beacon frame, and a probe request that is sent by the STA to the AP is an existing probe request frame. Then, in a probe response that is sent by the AP to the STA, the rich media information is carried in a vendor specific field of a frame in FIG. 5D.

Figure 5A:
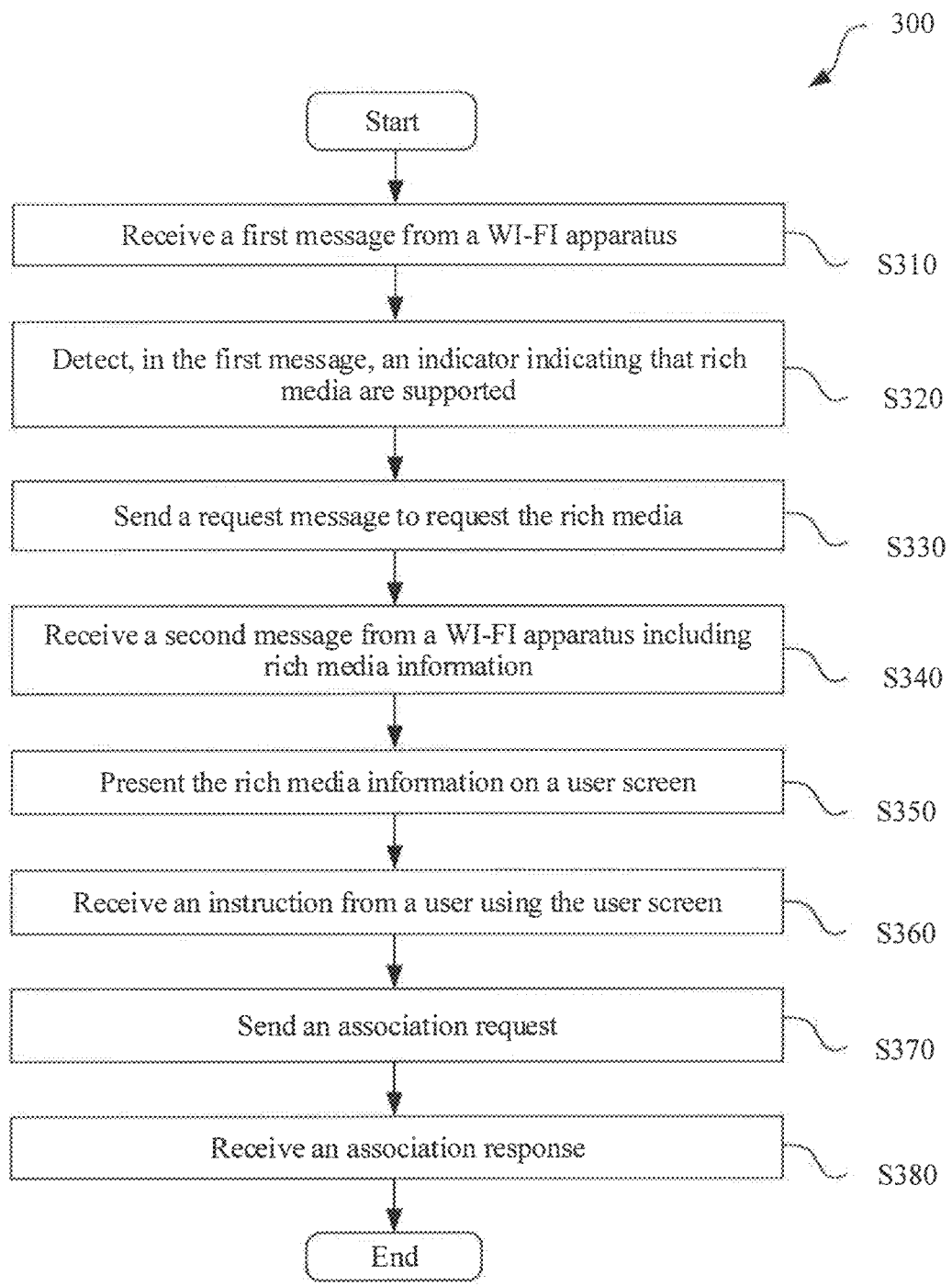
FIG. 5A is a flowchart of a method procedure example according to a third embodiment of the present disclosure.

If further interaction is required, a connection may be established with reference to steps S350 to S380 shown in FIG. 5A, and exchanged content is transmitted using a data frame. Alternatively, exchange may still be performed using a probe request and a probe response, and exchanged content is carried in a vendor specific field.

Third Embodiment

FIG. 5A is a flowchart of a method procedure example 300 according to this embodiment of the present disclosure. In an example, the method 300 is performed by a mobile terminal apparatus 250.

Step S310: Receive a first message from a WI-FI apparatus. In step S310, the mobile terminal apparatus 250 receives first information sent by an AP apparatus 210. As shown in FIG. 4, the AP apparatus 210 expects that an apparatus receives rich media information of the AP apparatus 210. Therefore, the AP apparatus 210 sends the first information such as a beacon signal, and the mobile terminal apparatus 250 receives the beacon signal sent by the AP apparatus 210. In an example, the mobile terminal apparatus 250 extracts a beacon frame from the beacon signal.

Step S320: Detect, in the first message, an indicator indicating that rich media are supported. In step S320, an indicator indicating that rich media are supported is detected in the first message. In an example in FIG. 4, the mobile terminal apparatus 250 detects an indicator in the beacon frame. The indicator indicates that the AP apparatus 210 that generates the beacon signal supports the rich media. For example, as shown in FIG. 5B, the indicator may indicate, in an SSID or a vendor specific field of the beacon frame, that rich media information is supported.

Step S330: Send a request message to request the rich media. In step S330, the mobile terminal apparatus 250 sends a request message to request the rich media information. In the example in FIG. 4, the mobile terminal apparatus 250 generates a request frame, where the request frame may be a probe request frame probe request, requests the rich media information, and sends to the AP apparatus 210 a radio signal 203 that carries the request frame. A structure of the request frame is shown in FIG. 5C, and request information is indicated in the vendor specific field.

Step S340: Receive a second message from a WI-FI apparatus including rich media information. In step S340, the AP apparatus 210 receives a second message including the rich media information. In the example in FIG. 4, when the AP apparatus 210 receives the request frame, the AP apparatus 210 generates a response frame including the rich media information, such as a probe response frame, and transmits a radio signal 204 including the response frame. The mobile terminal apparatus 250 receives the response frame. A structure of the probe response probe response frame is shown in FIG. 5D, and the rich media information is carried in the vendor specific field.

Step S350: Present rich media information on a user screen. In step S350, the rich media information is presented on a user screen. For example, when the rich media information includes texts such as a service introduction, a discount coupon summary, a short slogan, and similar content, for example, these texts may be displayed on a touchscreen display. Further, in an example, the rich media information includes indicators of other rich media, such as an audio indicator, a video indicator, and similar content. An icon related to a type of the rich media can be displayed on the touchscreen display.

Step S360: Receive an instruction from a user using the user screen. In step S360, an association instruction is received from a user using the user screen. In an example, when a user of the mobile terminal apparatus 250 touches, for example, a text or an icon, a control circuit in the mobile terminal apparatus 250 receives the association instruction. The instruction is generated in response to the touch on the mobile terminal apparatus 250.

Step S370: Send an association request. In step S370, an association request is sent. In the example shown in FIG. 4, the mobile terminal apparatus 250 sends to the AP apparatus 210 a radio signal 208 that carries the association request.

Step S380: Receive an association response. In step S380, an association response is received. In the example in FIG.

4, when the AP apparatus 210 receives the association request, the AP apparatus 210 sends to the mobile terminal apparatus 250 a radio signal 209 that carries the association response to notify the mobile terminal apparatus 250. The mobile terminal apparatus 250 receives the association response such that an association (or a data link) is established between the AP apparatus 210 and the mobile terminal apparatus 250.

It should be noted that if a connection is not established, exchange may still be performed using a probe request and a probe response, and exchanged content is carried in a vendor specific field.

This embodiment of the present disclosure further provides a manner in which the AP apparatus 210 (referred to as an AP below in this example) starts to indicate, in the probe response, that the rich media are supported. Further, a beacon frame that is sent by the AP to the mobile terminal apparatus 250 (referred to as a STA below in this example) is an existing beacon frame, and a probe request that is sent by the STA to the AP is an existing probe request frame. Then, in a probe response that is sent by the AP to the STA, information indicating that the AP supports a rich media function is carried in an SSID or vendor specific field of a frame in FIG. 5D.

In the probe request that is sent by the STA to the AP, as shown in FIG. 5C, request information is indicated in the vendor specific field.

In the probe response that is sent by the AP to the STA, as shown in FIG. 5D, rich media information is indicated in the vendor specific field.

If further interaction is required, a connection may be established with reference to steps S350 to S380, and exchanged content is transmitted using a data frame. Alternatively, exchange may still be performed using a probe request and a probe response, and exchanged content is carried in a vendor specific field.

In the foregoing steps, the AP may carry a value that is obtained after the rich media information is encoded and converted, summary information obtained after conversion, indicator information that can be correspondingly parsed by a receiving device, or the like. The carried summary information and indicator information may be parsed by the receiving device in a pre-agreed parsing manner, to obtain rich media information that exists before conversion. A manner of transmitting rich media information in another embodiment in this specification is the same as the manner described herein, and other corresponding content is not described.

Fourth Embodiment

Figures 6A, 6B:
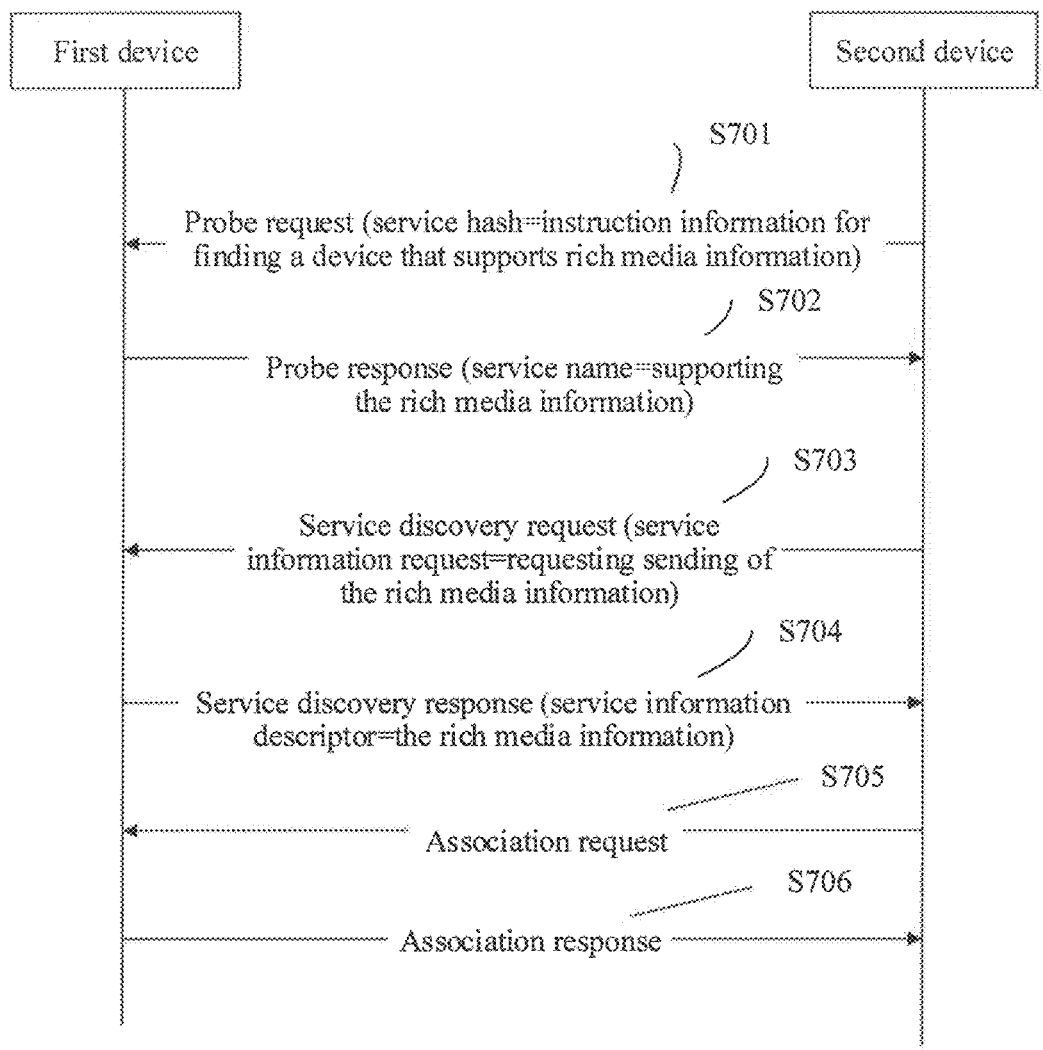
FIG. 6A is a flowchart of a method procedure example according to a fourth embodiment of the present disclosure.
FIG. 6B is a schematic diagram of a frame structure of a probe request frame according to a fourth embodiment of the present disclosure.

In an existing WI-FI network architecture, a method for creating a hopspot or a method of using an AP-STA mode is not required, that is, a first device and a second device are P2P devices. FIG. 6A shows a feasible message exchange procedure.

The first device is a service providing device, and can provide a rich media information sending service. The second device is a service searching device, and searches for a device that supports to send rich media information. In step S701, the second device expects to find a device that supports rich media information, and therefore, the second device broadcasts a probe request, and adds, to a service hash field or a vendor specific field, a hash value of instruction information used for instructing to search for the device that supports the rich media information. Refer to a probe request frame structure shown in FIG. 6B.

After receiving the probe request, the first device determines a requirement of the second device by matching the service hash value, and in step S702, responds to the second device with a probe response, and adds, to a service name field or a vendor specific field, indication information indicating that the first device supports the rich media information. Refer to a probe response frame structure shown in FIG. 6C.

In step S703, the second device sends a service discovery request (i.e., P2P discovery request) to the first device, and adds a rich media information sending request to a service information request field or the vendor specific field.

Refer to a service discovery request frame structure shown in FIG. 6D.

In step S704, after receiving the request, the first device sends a service discovery response (i.e., P2P discovery response) to the second device, adds the rich media information to a service information descriptor field or the vendor specific field, and sends the rich media information to the second device. Refer to a service discovery response frame structure shown in FIG. 6E.

In step S705, after receiving the rich media information, the second device presents the rich media information to a user of the second device, and sends an association request to the first device after receiving input (for example, a touch text or an icon in the rich media information) of the user. In step S706, the first device sends an association response to the second device, and an association connection is established between the first device and the second device after the association request message and the association response message are sent. After the association connection is established, the first device and the second device may exchange data.

In another example in FIG. 6A, the rich media information may be carried in a vendor specific field of a probe response frame sent by the first device to the second device. Steps S703 and S704 may be omitted.

Fifth Embodiment

Figures 7A, 7B, 7C, 7D:
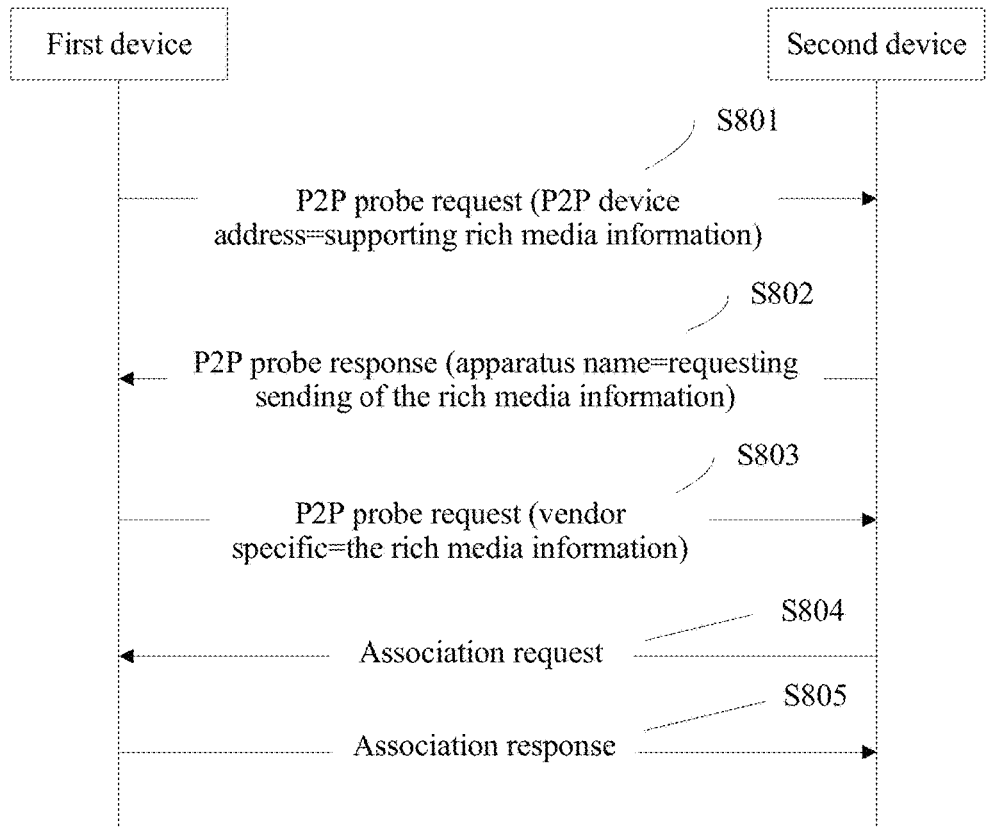
FIG. 7A is a flowchart of a method procedure example according to a fifth embodiment of the present disclosure.
FIG. 7B is a schematic diagram of a frame structure of a peer to peer (P2P) probe request frame according to a fifth embodiment of the present disclosure.
FIG. 7C is a schematic diagram of a frame structure of a P2P information element (IE) field according to a fifth embodiment of the present disclosure.
FIG. 7D is a schematic diagram of a frame structure of a P2P device identifier (ID) field according to a fifth embodiment of the present disclosure.

As shown in FIG. 7A, in step S801, a first device may send a P2P probe request to a second device. FIG. 7B shows a frame structure of a P2P probe request frame, including a P2P IE field and a vendor specific field.

As shown in FIG. 7C, a frame structure of the P2P IE field is as follows, including a P2P device ID field.

As shown in FIG. 7D, a frame structure of the P2P device ID field includes a P2P device address field.

Two of the foregoing fields may carry an indicator indicating that rich media information is supported, the P2P device address and the vendor specific.

In step S802, the second device may send a P2P probe response to the first device. FIG. 7E shows a frame structure of a P2P probe response frame, including a P2P IE field and a vendor specific field.

The P2P IE field is shown in FIG. 7F.

A P2P device information attribute P2P device info attribute in the P2P IE is shown in FIG. 7G.

Two of the fields may carry a request that requests to send the rich media information, the P2P device address in FIG. 7G and the vendor specific.

In step S803, the first device adds, using the P2P probe request frame, the rich media information to the vendor specific field, and sends the rich media information to the second device.

In step S804, the second device presents the rich media information to a user of the second device, and sends an association request to the first device after receiving input (for example, a touch text or an icon in the rich media information) of the user.

In step S805, the first device sends an association response to the second device.

After steps S804 and S805, an association is established between the first device and the second device, and the first device and the second device may exchange data.

Sixth Embodiment

Figures 8A, 8B, 8C:
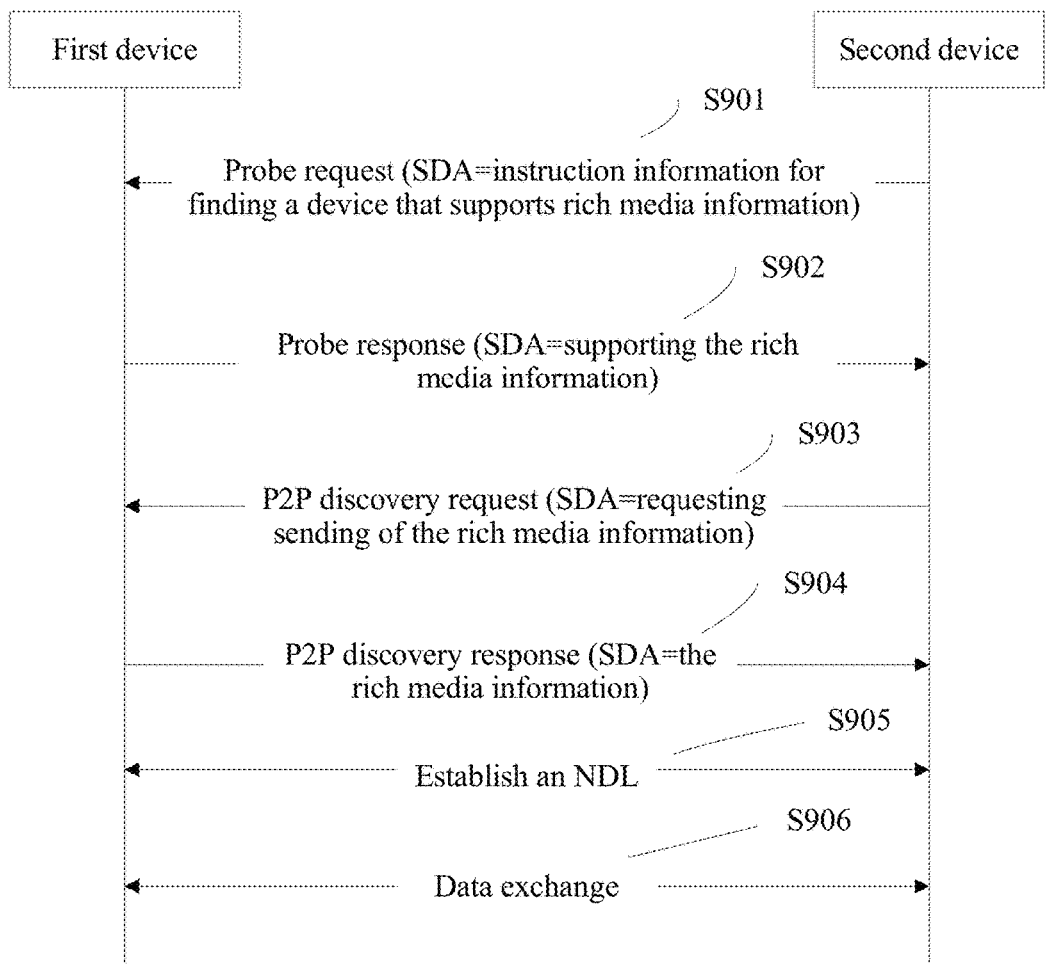
FIG. 8A is a flowchart of a method procedure example according to a sixth embodiment of the present disclosure.
FIG. 8B is a schematic diagram of a neighbor awareness network (NAN) service discovery frame (SDF) according to a sixth embodiment of the present disclosure.
FIG. 8C is a schematic diagram of a service discovery attribute (SDA) field according to a sixth embodiment of the present disclosure.

As shown in FIG. 8A, both a first device and a second device may be devices that support a NAN (or referred to as WI-FI Aware), and when the first device and the second device are in a same NAN cluster, the first device and the second device may discover (refer to steps S801 to S804) each other by sending an SDF.

For example, various NAN attributes may be shown in a format of a NAN SDF in FIG. 8B. Related instruction information and request information are carried in an SDA field of an SDF message.

FIG. 8C shows a format of the SDA, the instruction/request information is carried in a service ID field or a service info field (such as step S901), and rich media information is carried in the service info.

For example, in step S902, an indicator indicating that the first device supports the rich media information is carried in the service ID field or the service info field.

In step S903, the second device requests sending of the rich media information using the service ID field or the service info field.

In step S904, the first device sends the rich media information using the service info field.

The second device presents the rich media information to a user of the second device, and a NAN data link (NDL) is established between the first device and the second device after input (for example, a touch text or an icon in the rich media information) of the user is received.

Further, exchanged information may be exchanged (refer to step S906) based on the NDL established between the first device and the second device (refer to step S905). Alternatively, the SDF message may continue to be exchanged, and information may be exchanged using the service info field of the SDF message.

In the embodiments corresponding to FIG. 3A to FIG. 8C, an implementation that the rich media are used as an information publishing platform may be used to shorten a distance for communication between an information publisher and an information receiver. Because both the information publisher and the information receiver are in a same local area network, the information publisher and the information receiver may exchange opinions about matter of interest offline. Therefore, various transactions are easily conducted, an activity is organized, and information is shared.

Seventh Embodiment

Figure 9:
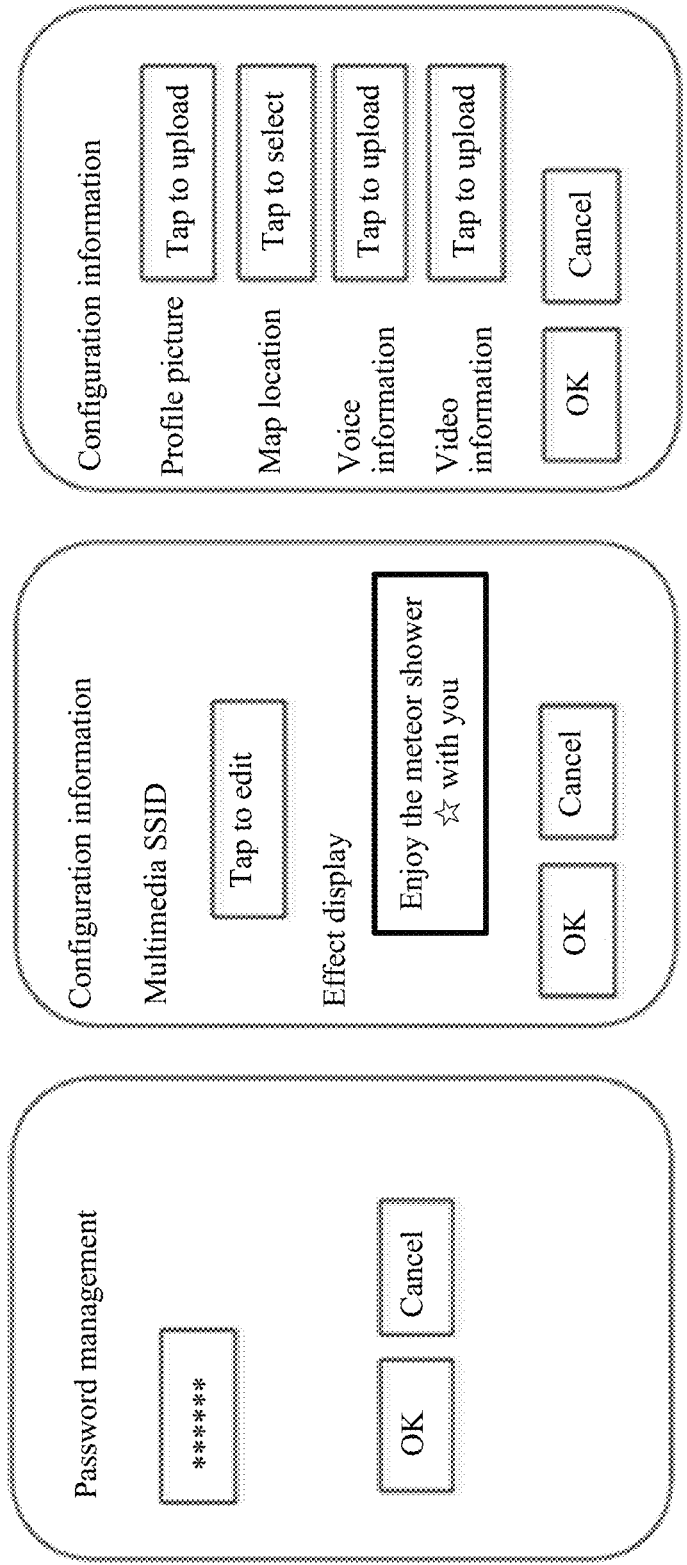
FIG. 9 is a schematic diagram of rich media information configuration according to a seventh embodiment of the present disclosure.

For how to obtain rich media information in an AP, refer to an example shown in FIG. 9. The AP may be a tablet computer or a mobile phone, and supports a rich media feature.

A leftmost block in FIG. 9 shows authorization operations such as starting, by a user of the AP, a management interface (i.e., webpage user interface (web UI)) of the AP or specific application software and entering an administrator password. If authorization succeeds, configuration steps shown in a block in the middle of FIG. 9 are performed.

The block in the middle of FIG. 9 shows a key for editing "multimedia SSID." For a display effect obtained after editing, refer to a displayed figure that is changed from a character part in "Enjoy the meteor shower with you" in the third row of the block in the middle.

Further, a rightmost block in FIG. 9 may show that for each piece of rich media information, the user of the AP enables a rich media information function switch, and inputs and uploads various rich media files. For example, in the rightmost block in FIG. 9, a profile picture of the user of the AP, video information, a map location, voice information, or a figure file may be uploaded.

After all settings shown in FIG. 9 are completed, the AP may be accessed by another mobile terminal apparatus.

After the key for editing "multimedia SSID" in FIG. 9 is tapped, the display effect of "Enjoy the meteor shower with you" is displayed in an SSID in the fourth row of FIG. 3A. The "meteor" is replaced by an image of a star.

After the "profile picture" in FIG. 9 is configured, corresponding configuration of the profile picture is mapped to and displayed on a location of a profile picture icon in the fourth row of FIG. 3A.

After a further information icon (for example, a right-facing angle bracket in the fourth row of FIG. 3A) in the fourth row of FIG. 3A is tapped, in FIG. 3B, three icons are displayed on the right of "Enjoy the meteor shower with you," and sequentially represent a picture file, a map location, and a video file. These three types of rich media information are configured according to the rightmost block in FIG. 9, and the rich media information is mapped to content corresponding to the further information icon. In this way, after the further information icon in the fourth row of FIG. 3A is tapped, the picture file, the map location, and the video file are displayed on the right of the SSID in the fourth row of FIG. 3B.

The picture file may be a picture for introducing the meteor shower, the map location may be a location at which the meteor shower can be enjoyed, and the video file may be a song or a video related to the meteor shower.

Eighth Embodiment

Figure 10:
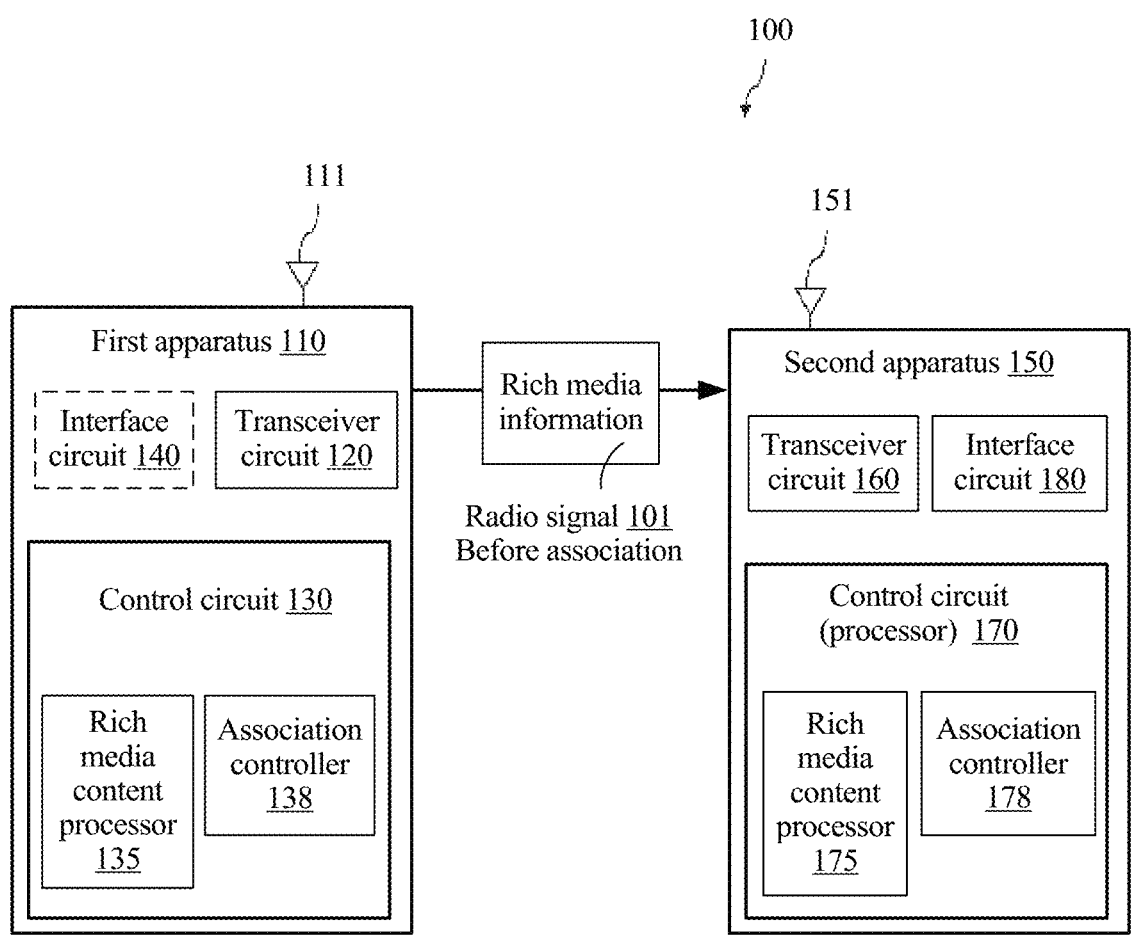
FIG. 10 is a schematic diagram of a wireless communications system according to an eighth embodiment of the present disclosure.

FIG. 10 shows a wireless communications system 100 according to an embodiment. The communications system 100 includes some apparatuses such as a first apparatus 110, a second apparatus 150, and another apparatus (which is not shown). One of these apparatuses, for example, the first apparatus 110 in FIG. 10, expects that an apparatus receives rich media information of the first apparatus 110. Therefore, a radio signal 101 is sent to the second apparatus 150, and the radio signal 101 carries the rich media information. During sending of the radio signal 101, an association (or a data connection) does not need to be established between the first apparatus 110 and the second apparatus 150.

The wireless communications system 100 may be any proper wireless communications system. For example, the wireless communications system 100 is based on a WLAN technology, for example, based on a standard such as The Institute of Electrical and Electronics Engineers (IEEE) 802.11. Some apparatuses in the communications system 100 include proper hardware and software parts. These hardware and software parts support a WI-FI technology and the like.

The first apparatus 110 and the second apparatus 150 may be any proper apparatuses that can communicate with each other using a radio signal. In an example, the first apparatus 110 may be a wireless AP apparatus such as a wireless router or a similar apparatus. The wireless AP apparatus may be connected to a wired network, and a device following WI-FI is allowed to communicate with the wireless AP apparatus using the wired network. The second apparatus 150 may be a terminal apparatus such as a desktop computer, a notebook computer, a netbook, a smartphone, or a similar apparatus that enables WI-FI. In another example, the first apparatus 110 and the second apparatus 150 are terminal apparatuses that can enable WI-FI.

According to an aspect of this embodiment, before a connection is established between the first apparatus 110 and the second apparatus 150, the first apparatus 110 sends the radio signal 101 that carries the rich media information, and the second device 150 can receive the radio signal 101 that carries the rich media information, and display the rich media information on a user screen to help a user of the second apparatus 150 make a connection decision. The rich media information includes information in different media content formats, for example, a text, audio, an image, an animation, a video, exchanged content, and another similar content. In an example, the rich media information includes an indicator indicating that the first apparatus 110 supports rich media. In another embodiment, the rich media information includes rich media content. It should be noted that, in an example, before an association is established between the first apparatus 110 and the second apparatus 150, the first apparatus 110 and the second apparatus 150 may exchange the rich media information. Further, in an example, exchange of the rich media information can help the user make the connection decision.

It should be further noted that the radio signal 101 may be any proper signal according to a proper communications protocol, for example, a beacon beacon signal, a probe request probe request signal, a probe response probe response signal, a service discovery request service discovery request signal, a service discovery response service discovery response signal, and another similar signal. Further, the rich media information may be carried in various fields of a management frame, for example, an apparatus name device name field, a service hash service hash field, a service name service name field, a service information service information field, a vendor specific vendor specific field, and another similar field. In an example, after the association (or a data link) is established between the first apparatus 110 and the second apparatus 150, the rich media information can be exchanged using a data frame.

Specially, in an example in FIG. 10, the second apparatus 150 includes a transceiver circuit 160, an interface circuit 180, and a control circuit 170 that are coupled together.

The transceiver circuit 160 is configured to receive and send a radio signal. In an example, the control circuit 170 may be a circuit that receives a data flow, and the data flow is, for example, a management frame, a data frame, or another similar frame. The transceiver circuit 160 is configured to generate a radio frequency (RF) signal to carry the data flow, and send an electromagnetic wave to the air using an antenna 151 to transmit a radio signal that carries information. Further, after the antenna 151 obtains the electromagnetic wave, the transceiver circuit 160 generates an electrical signal, processes the electrical signal, and extracts a digital stream from the electrical signal.

The interface circuit 180 is configured to help interact with a user of the second apparatus 150. In an example, the interface circuit 180 includes a touchscreen display, displays information using a graphical user interface (GUI), and generates a user instruction after a user touch operation is performed on the touchscreen display.

The control circuit 170 is configured to perform various control operations. In an example, the control circuit 170 includes a processor that can execute a software instruction and perform an operation according to the software instruction. Specially, in an example in FIG. 10, the control circuit 170 includes a rich media content processor 175 and an association controller 178. The rich media content processor 175 is configured to process the rich media information, for example, decode the rich media information, encode the rich media information, play the rich media information, and process the rich media information in another similar processing manner. The association controller 178 is configured to control an association between the second apparatus 150 and another apparatus such as the first apparatus 110 according to a proper protocol. In an example, the association controller 178 is configured to generate an association request and process an association response.

In the example of FIG. 10, the first apparatus 110 includes a transceiver circuit 120 and a control circuit 130. In an example, when the first apparatus 110 is a mobile terminal apparatus, the first apparatus 110 further includes an interface circuit 140.

In an operation, for example, the first apparatus 110 sends a radio signal that carries the rich media information, and the second apparatus 150 receives the radio signal that carries the rich media information. In this case, an association between the first apparatus 110 and the second apparatus 150 is not established. Further, the second apparatus 150 can process the rich media information. For example, the transceiver circuit 160 can process the radio signal, and re-generate a digital stream from the radio signal. The rich media content processor 175 can extract the rich media information from the digital stream, and decode the rich media information. Then, the interface circuit 180 can display the rich media information on a touchscreen display or the like.

Further, in an example, after the user performs a touch operation on a touch display screen, the interface circuit 180 receives an association instruction. Then, the association controller 178 can generate an association request, and the transceiver circuit 160 can send to an association controller 138 of the first apparatus 110 a radio signal that carries the association request using antenna 111 such that a second apparatus 150 is associated with a first apparatus 110. In this way, a data link is established between the first apparatus 110 and the second apparatus 150, and the first apparatus 110 can communicate with the second apparatus 150 using the data link. Further, the first apparatus 110 also includes a rich media content processor 135 similar to the rich media content processor 175 of the second apparatus 150.

Ninth Embodiment

Figure 11A:
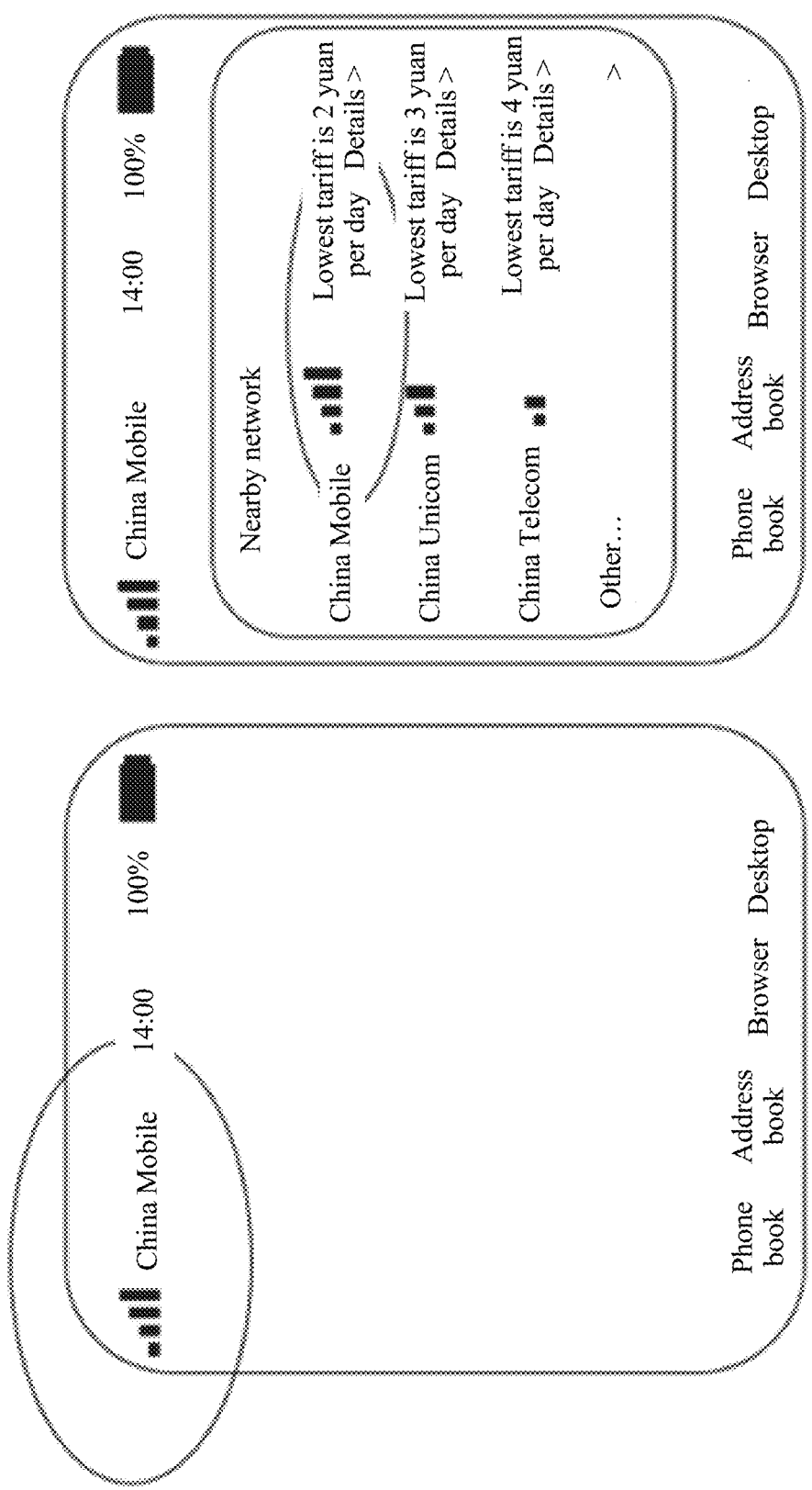
FIG. 11A is a schematic diagram of nearby network viewing according to a ninth embodiment of the present disclosure.

As shown in FIG. 11A, on a second apparatus (such as a mobile phone), a vendor name on a display screen that is of the second apparatus and that is shown in a left image in FIG. 11A may be tapped such that a network status that is of each vendor in networks near the second apparatus and that is displayed in a right image in FIG. 11A is learned. As shown in the right image in FIG. 11A, in nearby networks, a network of China Mobile has a strongest signal with four-bar signal strength, and a lowest tariff is 2 yuan per day. China Unicom has three-bar signal strength, and a lowest tariff is 3 yuan per day. China Telecom has two-bar signal strength, and a lowest tariff is 4 yuan per day.

Figure 11B:
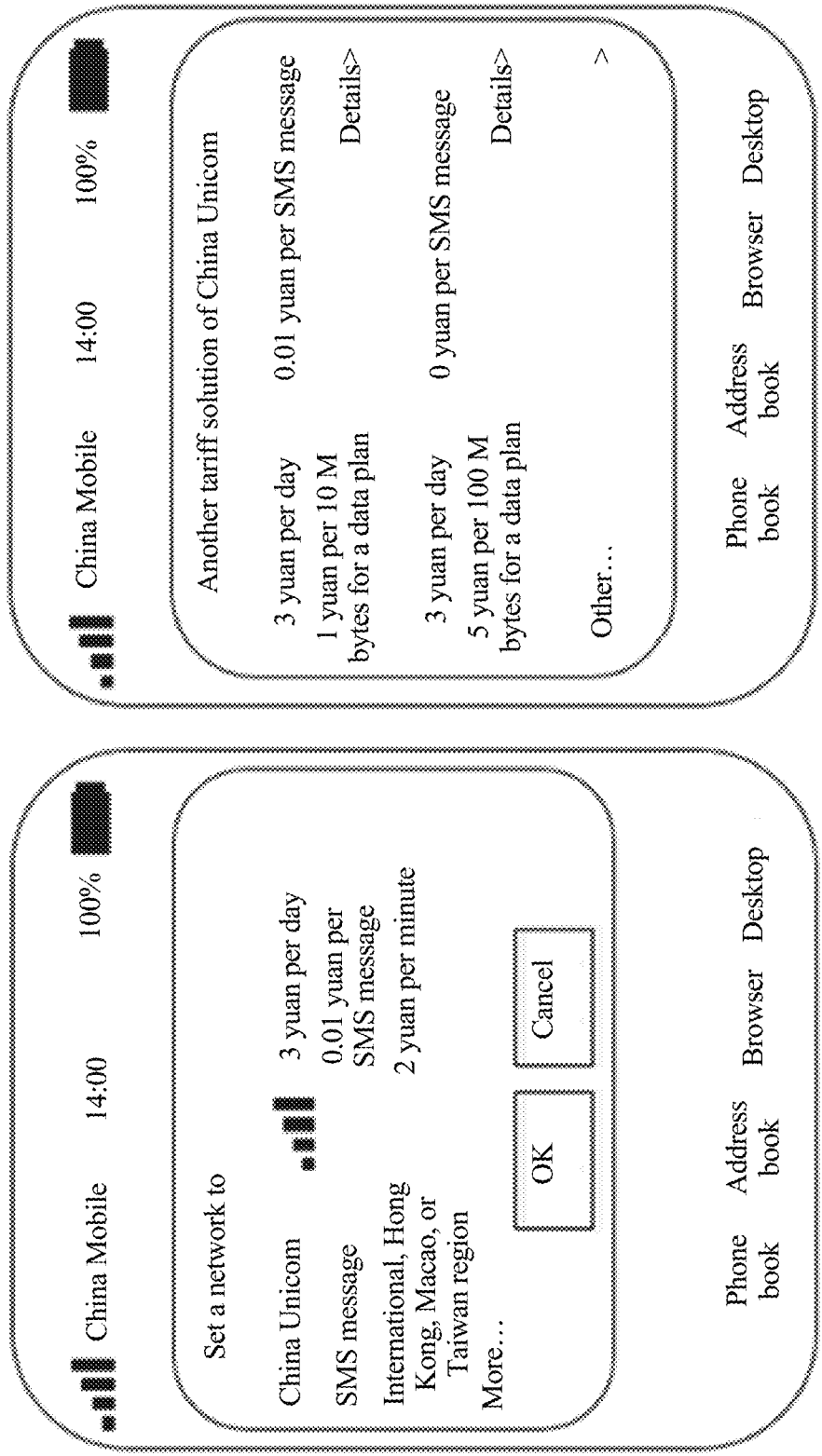
FIG. 11B is a schematic diagram of viewing detailed information of a nearby network according to a ninth embodiment of the present disclosure.

When a user of the second apparatus taps a region including a vendor name (for example, China Mobile), a signal strength icon, and "a lowest tariff is 2 yuan per day," a display screen of the second apparatus is changed to a left image in FIG. 11B. In the left image in FIG. 11B, the user of the second apparatus is prompted whether a network needs to be set to China Unicorn, this is because the user of the second apparatus selects an entry "China Unicorn" in the right image in FIG. 11A.

When the user of the second apparatus taps a region "details" of China Unicorn in the right image in FIG. 11A, a display screen of the second apparatus is changed to a right image in FIG. 11B. The right image in FIG. 11B displays other tariff solutions of China Unicorn, including two solutions displayed in the right image in FIG. 11B. One includes 3 yuan per day, 0.01 yuan per short message service (SMS) message, and 1 yuan per 10 mega (M) bytes for a data plan. The other solution includes 3 yuan per day, 0 yuan per SMS message, and 5 yuan per 100 M bytes for a data plan.

Figure 12:
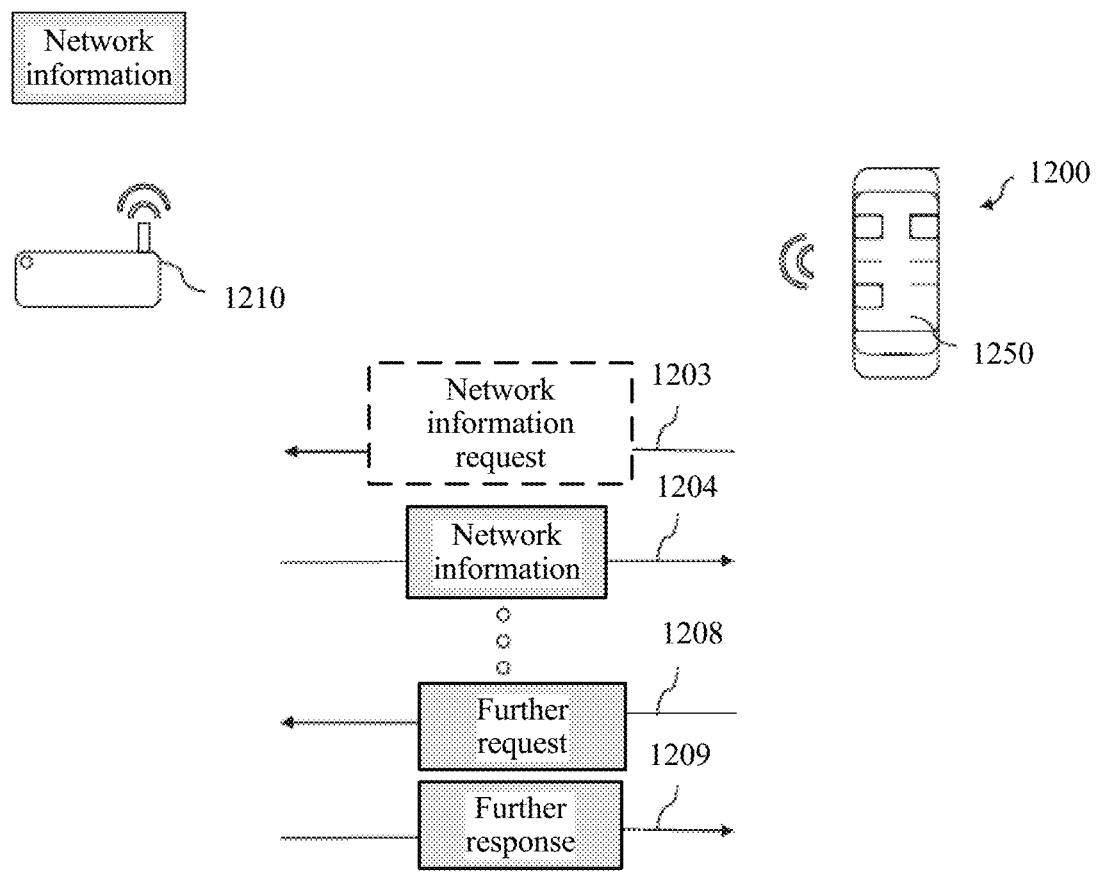
FIG. 12 is a flowchart of a method procedure example according to a ninth embodiment of the present disclosure.

FIG. 12 is a diagram of a wireless communications system 1200 according to an embodiment of the present disclosure. The wireless communications system 1200 is an example of a network side device-mobile terminal apparatus in a wireless communications system. The communications system 1200 includes a network side device 1210 and a mobile terminal apparatus 1250.

In an operation, refer to step 1203. A user of the mobile terminal apparatus 1250 taps an icon of "China Mobile" on a display screen of the terminal apparatus 1250, that is, the mobile terminal apparatus 1250 is triggered to send a network information request in step 1203 to the network side device 1210 on a local end.

In step 1204, after receiving the network information request in step 1203, the network side device 1210 sends information about a network nearby the terminal apparatus 1250 to the terminal apparatus 1250. The information about the nearby network includes signal strength and tariff information of China Mobile, China Unicorn, and China Telecom.

In step 1208, the terminal apparatus 1250 presents the information about the nearby network to the user of the terminal apparatus 1250, detects whether a region including a vendor name (for example, China Mobile), a signal strength icon, and "a lowest tariff is 2 yuan per day" or a region "details" of China Unicorn in the right image in FIG. 11A is tapped, and triggers a further request if the region is tapped. The further request is sent by the terminal apparatus 1250 to the network side device 1210.

In step 1209, after receiving the further request in step 1208, the network side device 1210 sends to the terminal apparatus 1250, information that is requested by the terminal apparatus 1250 in the further request. When it is detected that the region including a vendor name (for example, China Mobile), a signal strength icon, and "a lowest tariff is 2 yuan per day" is tapped, the requested information is whether to set a network to China Unicom. When it is detected that the region "details" of China Unicom in the right image in FIG. 11A is tapped, the requested information is another tariff solution of China Unicom.

In steps 1203, 1204, 1208, and 1209, information involved in the steps is carried in a network signal for transmission. The network signal includes but is not limited to a general packet radio service (GPRS) signal, a second generation (2G) signal, a third generation (3G) signal, or a fourth generation (4G) signal.

In the embodiment corresponding to FIG. 12, step 1203 may be omitted. For example, after the terminal apparatus 1250 arrives at a specific site, the network side device 1210 may actively push signal strength and tariff information of each vendor to the terminal apparatus 1250.

A constituent component and a feature of the present disclosure are combined according to a predetermined format, to provide the following embodiments. When there is no additional mark, each constituent component or feature should be considered as an optional factor. Each constituent component or feature may not be combined with another component or feature if necessary. In addition, some constituent components and/or features may be combined, to implement the embodiments of the present disclosure. An operation order to be disclosed in the embodiments of the present disclosure may be changed. Alternatively, some components or features in any embodiment may be included in another embodiment, or may be replaced with components or features in another embodiment according to a requirement.

It should be noted that a specific term disclosed in the present disclosure is proposed such that descriptions of the present disclosure are brief and are easy to be understood. Further, use of these specific terms may be changed to another format within the technical scope or the spirit of the present disclosure.

In some embodiments, a well-known structure or device is omitted, to avoid obscuring a concept of the present disclosure, and important functions of these structures and devices are shown in a block diagram. A same reference numeral is used in the entire accompanying drawings to represent same or similar parts.

If an operation or a function of the present disclosure is implemented using firmware or software, the present disclosure may be implemented in various formats, for example, a module, a processor, or a function. Software code may be stored in a memory unit such that the memory unit can be driven by a processor. The memory unit is located inside or outside the processor such that the memory unit communicates with the processor using various known parts.

Detailed descriptions of example embodiments of the present disclosure are disclosed such that persons skilled in the art can implement or practice the present disclosure. Although the present disclosure is described with reference to the example embodiments, persons skilled in the art should understand that the present disclosure may be modified and changed without departing from the spirit or scope of the present disclosure described in the claims. For example, persons skilled in the art may combine the structures described in the embodiments for use. Therefore, the present disclosure should not be limited to a specific embodiment described herein but needs to be in the widest scope that complies with the principles and novelty disclosed herein.

Persons skilled in the art should understand that the present disclosure may be implemented in a specific manner other than a manner described herein without departing from the spirit and essential feature of the present disclosure. Therefore, the example embodiments are explained in all aspects serving as examples instead of limitations. A scope of the present disclosure should be determined by the accompanying claims and law equivalent content of the claims instead of the foregoing descriptions, and all change intentions within a meaning and equivalent scope of the accompanying claims are included. Further, obviously, some claims that cite specific claims and other claims that cite claims other than the specific claims may be combined to form an embodiment, or a new claim is added by means of modification after this application is submitted.

What is claimed is:

1. A device, comprising:
a transceiver circuit configured to:
receive, from another device, a beacon signal that includes an indicator indicating that the other device supports providing pre-association rich media information corresponding to rich media content comprising audio or video;
subsequent to receiving the beacon signal, send, to the other device, a radio signal that carries a request message that includes a rich media request for the pre-association rich media information; and
subsequent to sending the radio signal, receive a first message frame in a radio signal from the other device, wherein the first message frame is received before the device is associated with the other device;
an interface circuit coupled to the transceiver circuit and configured to:
provide a user screen;
provide information for a user; and
receive input of the user; and
a control circuit coupled to the transceiver circuit and the interface circuit and configured to:
detect the pre-association rich media information in the first message frame; and
display, using the user screen, a Wi-Fi network selection screen including a selectable icon corresponding to the pre-association rich media information in the first message frame in association with a Wi-Fi network name corresponding to the pre-association rich media information, wherein the selectable icon is selectable independently of the Wi-Fi network name; and
change from displaying the Wi-Fi network selection screen to displaying a second screen for playing the rich media content in response to receiving input selecting the selectable icon.

2. The device of claim 1, wherein the pre-association rich media information is carried in a vendor specific field, and wherein the control circuit is further configured to generate the request message.

3. The device of claim 1, wherein the control circuit is further configured to:
receive the first message frame;
detect the indicator in a vendor specific field of the first message frame;
receive a second message frame comprising the rich media content after generating the request message; and
detect the rich media content in a vendor specific field of the second message frame.

4. The device of claim 1, wherein the control circuit is further configured to receive the first message frame from the other device in at least one of the following signals:
a beacon signal;
a probe response signal; or
a service discovery response signal.

5. The device of claim 1, wherein the control circuit is further configured to generate a probe request message frame that comprises a request indicator that instructs to probe a device supporting rich media.

6. The device of claim 1, wherein the control circuit is further configured to provide a screen indicator on the user screen to show the pre-association rich media information.

7. The device of claim 6, wherein the control circuit is further configured to:
receive an association instruction from a user using the interface circuit;
generate an association request frame; and
send to the other device a radio signal carrying the association request frame.

8. A method of communication between a first apparatus and a second apparatus, the method comprising:
receiving, from the first apparatus, a beacon signal that includes an indicator indicating that the first apparatus supports providing pre-association rich media information corresponding to rich media content comprising audio or video;
subsequent to receiving the beacon signal, sending, to the first apparatus, a radio signal that carries a request message that includes a rich media request for the pre-association rich media information;
subsequent to sending the radio signal, receiving, by the second apparatus from the first apparatus and before the second apparatus is associated with the first apparatus, a radio signal carrying a first message frame;
detecting, by the second apparatus, the pre-association rich media information in the first message frame; and
displaying, by the second apparatus on a user screen of the second apparatus, a Wi-Fi network selection screen including a selectable icon corresponding the pre-association rich media information in the first message frame in association with a Wi-Fi network name corresponding to the pre-association rich media information, wherein the selectable icon is selectable independently of the Wi-Fi network name; and
changing from displaying the Wi-Fi network selection screen to displaying a second screen for playing the rich media content in response to receiving input selecting the selectable icon.

9. The method of claim 8, wherein the pre-association rich media information is carried in a vendor specific field, and further comprising generating the request message.

10. The method of claim 8, further comprising:
detecting, by the second apparatus, the indicator in a vendor specific field of the first message frame;
receiving, by the second apparatus, a second message frame comprising the rich media content in response to the request message; and
detecting, by the second apparatus, the rich media content in a vendor specific field of the second message frame.

11. The method of claim 8, wherein receiving the radio signal carrying the first message frame comprises at least one of the following:
receiving, by the second apparatus, the first message frame in a beacon signal from the first apparatus;
receiving, by the second apparatus, the first message frame in a probe response signal from the first apparatus; or
receiving, by the second apparatus, the first message frame in a service discovery response signal from the first apparatus.

12. The method of claim 8, further comprising:
generating, by the second apparatus, a probe request message frame, wherein the probe request message frame comprises a request indicator that instructs to probe an apparatus supporting rich media; and
receiving, by the second apparatus, the first message frame from the first apparatus after the first apparatus receives the probe request message frame.

13. The method of claim 8, further comprising providing a screen indicator on the user screen to indicate the pre-association rich media information.

14. The method of claim 13, further comprising:
receiving, by the second apparatus, an association instruction from a user using the user screen;
generating, by the second apparatus, an association request frame; and
sending, by the second apparatus, a radio signal carrying the association request frame to the first apparatus.

15. A first peer-to-peer device, comprising:
a control circuit configured to generate a pre-association message frame comprising rich media information corresponding to rich media content comprising audio or video; and
a transceiver circuit coupled to the control circuit and configured to transmit the pre-association message frame to a second peer-to-peer device before the first peer-to-peer device is associated with the second peer-to-peer device to cause the second peer-to-peer device to display, in association with a Wi-Fi network name and in a Wi-Fi network selection screen, an icon that is selectable independent of the Wi-Fi network name to cause the second peer-to-peer device to display a second screen for playing the rich media content.

16. The first peer-to-peer device of claim 15, wherein the control circuit is further configured to:
receive an instruction;
enable a rich media feature; and
generate the pre-association message frame in response to the instruction.

17. The first peer-to-peer device of claim 15, wherein the control circuit is further configured to generate a first message frame, wherein the first message frame comprises an indicator, and wherein the indicator indicates that pre-association rich media are supported.

18. The first peer-to-peer device of claim 17, wherein the indicator is comprised in a vendor specific field of the first message frame.

19. The first peer-to-peer device of claim 18, wherein the control circuit is further configured to generate a second message frame in response to a request message frame of the second peer-to-peer device, and wherein rich media content is comprised in a vendor specific field of the second message.

20. The first peer-to-peer device of claim 15, wherein the control circuit is further configured to generate at least one of a beacon frame, a probe response frame, or a service discovery response frame to comprise the rich media information.

* * * * *

UNITED STATES PATENT AND TRADEMARK OFFICE
CERTIFICATE OF CORRECTION

PATENT NO. : 10,721,610 B2  
APPLICATION NO. : 15/771855  
DATED : July 21, 2020  
INVENTOR(S) : Wei Qin and Xiaoxian Li Page 1 of 1

It is certified that error appears in the above-identified patent and that said Letters Patent is hereby corrected as shown below:

On the Title Page

Title (54), 1st Column, Line 2: "Apparatus for Pr-Association Rich" should read "Apparatus for Pre-Association Rich"

Page 2, Foreign Patent Documents, 2nd Column, Line 9: "CN 105357741 2/2016" should read "CN 105357741 A 2/2016"

Signed and Sealed this  
Twenty-fifth Day of August, 2020

Andrei Iancu  
*Director of the United States Patent and Trademark Office*